(12) United States Patent
Suzuki et al.

(10) Patent No.: US 8,582,691 B2
(45) Date of Patent: Nov. 12, 2013

(54) RECEIVING APPARATUS AND RECEIVING METHOD

(75) Inventors: Mototsugu Suzuki, Yokosuka (JP);
Tetsurou Imai, Yokosuka (JP);
Koushirou Kitao, Yokohama (JP);
Yoshihiro Ishikawa, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 180 days.

(21) Appl. No.: 13/121,118

(22) PCT Filed: Sep. 4, 2009

(86) PCT No.: PCT/JP2009/065487
§ 371 (c)(1),
(2), (4) Date: May 12, 2011

(87) PCT Pub. No.: WO2010/035623
PCT Pub. Date: Apr. 1, 2010

(65) Prior Publication Data
US 2011/0222632 A1    Sep. 15, 2011

(30) Foreign Application Priority Data
Sep. 26, 2008    (JP) .................................. 2008-248880

(51) Int. Cl.
*H03K 9/00*    (2006.01)
(52) U.S. Cl.
USPC ........... 375/316; 375/148; 375/260; 375/147; 455/501
(58) Field of Classification Search
USPC .................................. 375/316, 206; 455/501
See application file for complete search history.

(56) References Cited

U.S. PATENT DOCUMENTS

| | | | |
|---|---|---|---|
| 7,315,623 B2 * | 1/2008 | Gierl et al. .................. | 381/71.12 |
| 8,000,379 B2 * | 8/2011 | Kishigami et al. ............ | 375/148 |
| 2003/0100267 A1 | 5/2003 | Itoh et al. | |
| 2007/0036231 A1 | 2/2007 | Ido | |

(Continued)

FOREIGN PATENT DOCUMENTS

| | | |
|---|---|---|
| JP | 2000-286821 A | 10/2000 |
| JP | 2002-300131 A | 10/2002 |

(Continued)

OTHER PUBLICATIONS

Patent Abstracts of Japan, Publication No. 2004-266814, dated Sep. 24, 2004, 1 page.

(Continued)

*Primary Examiner* — Eva Puente
(74) *Attorney, Agent, or Firm* — Osha Liang LLP

(57) ABSTRACT

A receiving apparatus for receiving a downlink signal in which pilot symbols are mapped discontinuously, includes: a unit configured to extract reference signals from the downlink signal that is Fourier transformed by a Fourier transform unit; a unit configured to generate a first signal having a first window size by arranging the extracted reference signals on the frequency axis and by performing inverse Fourier transform on the reference signals; a unit configured to divide the first signal into a plurality of signals to extract a signal included in a second window; a unit configured to generate a second signal that includes the signal included in the second window and that has a window size similar to the first window size; a Fourier transform unit configured to generate a third signal from the second signal; and a unit configured to calculate received power based on the third signal.

7 Claims, 12 Drawing Sheets

(56) References Cited

U.S. PATENT DOCUMENTS

| | | | |
|---|---|---|---|
| 2007/0053416 A1* | 3/2007 | Li et al. | 375/147 |
| 2007/0274406 A1* | 11/2007 | Adachi | 375/260 |
| 2008/0112309 A1 | 5/2008 | Hamaguchi et al. | |
| 2009/0068956 A1* | 3/2009 | Naito et al. | 455/67.11 |
| 2009/0196166 A1 | 8/2009 | Hamaguchi et al. | |
| 2009/0285086 A1* | 11/2009 | Adachi | 370/210 |
| 2010/0255867 A1* | 10/2010 | Ishii et al. | 455/501 |

FOREIGN PATENT DOCUMENTS

| | | | |
|---|---|---|---|
| JP | 2004-266814 A | 9/2004 | |
| JP | 2006-191583 A | 7/2006 | |
| JP | 2009-129510 A | 6/2009 | |
| WO | 02/41530 A1 | 5/2002 | |
| WO | 2004100413 A1 | 11/2004 | |
| WO | 2006/075732 A1 | 7/2006 | |
| WO | 2007142343 A1 | 12/2007 | |

OTHER PUBLICATIONS

Patent Abstracts of Japan, Publication No. 2009-129510, dated Jun. 11, 2009, 1 page.

Patent Abstracts of Japan, Publication No. 2006-191583, dated Jul. 20, 2006, 1 page.

International Search Report issued in PCT/JP2009/065487, mailed on Oct. 6, 2009, with translation, 9 pages.

Written Opinion issued in PCT/JP2009/065487, mailed on Oct. 6, 2009, 3 pages.

Japanese Office Action for Application No. 2008-248880, mailed on Jan. 8, 2013 (5 pages).

esp@cenet Patent Abstract for WO 2004/100413, publication date Nov. 18, 2004. (1 page).

Patent Abstracts of Japan for Japanese Publication No. 2002-300131, publication date Oct. 11, 2002 (1 page).

Patent Abstracts of Japan for Japanese Publication No. 2000-286821, publication date Oct. 13, 2000 (1 page).

esp@cenet Patent Abstract for WO 2007/142313, publication date Dec. 13, 2007. (1 page).

Suzuki, et al., "A Study on SIR Measurement Method Using RS for Service Area Evaluation in LTE System", Technical Report of the Communication Society Conference in 2008 of the Institute of Electronics, Information and Communication Engineers (IEICE), B-1-24, pp. 24, Sep. 2, 2008.

* cited by examiner

FIG.12
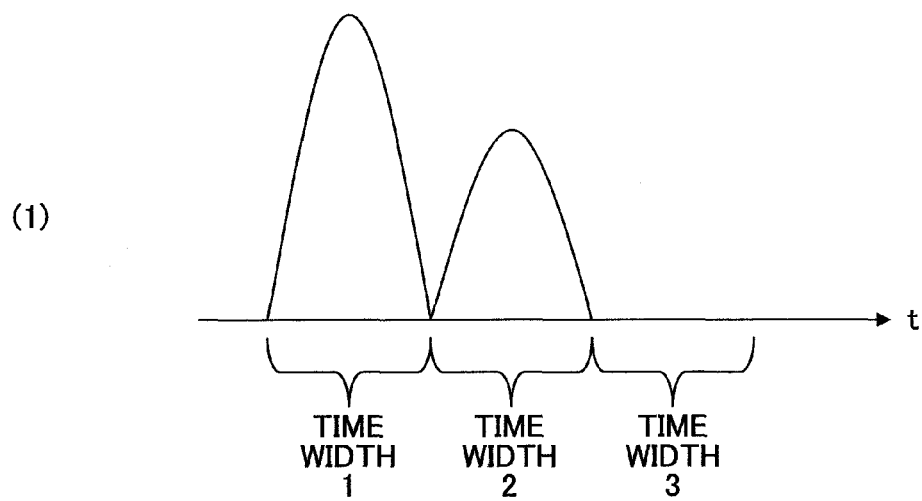
(1)
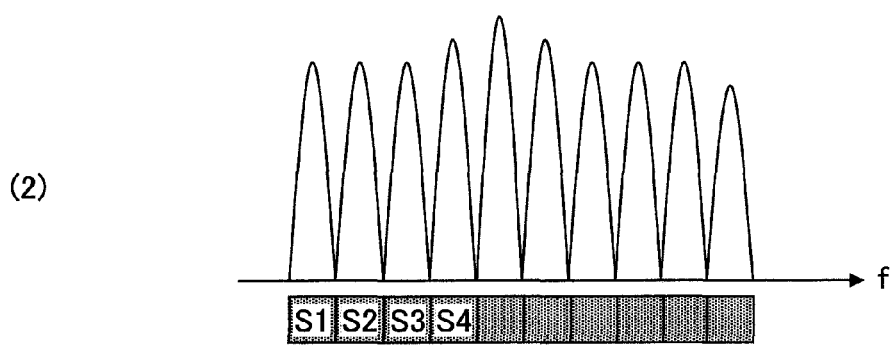
(2)
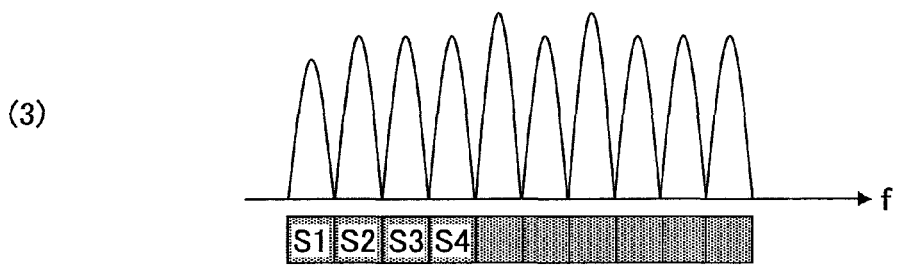
(3)

RECEIVING APPARATUS AND RECEIVING METHOD

TECHNICAL FIELD

The present invention relates to a mobile communication system. More particularly, the present invention relates to a receiving apparatus and a receiving method.

BACKGROUND ART

As shown in FIG. 1, in a mobile communication system of the W-CDMA (Wideband-Code Division Multiple Access) scheme, a receiving apparatus (a mobile station, for example) performs despreading processing on a W-CDMA signal transmitted by a base station, and calculates downlink radio quality using an obtained common pilot channel (CPICH). The calculation of the downlink radio quality may include obtaining received power of a desired wave and an interference wave.

For example, in the mobile communication system of the W-CDMA scheme, the receiving apparatus calculates received power in the downlink by performing averaging processing on received signals $r_n$ and $r_{n+1}$ of two pilot signals $S_n$ and $S_{n+1}$ continuously transmitted in a time axis direction using the following equations.

$$\lambda_1 = 1/2N_s \times \sum_1^{N_s-1} |r_n + r_{n+1}|^2 \quad (1)$$

$$\lambda_2 = 1/2N_s \times \sum_1^{N_s-1} |r_n - r_{n+1}|^2 \quad (2)$$

$$RSCP = 1/2 \times |\lambda_1 - \lambda_2| \quad (3)$$

$$ISSI = \lambda_2 \quad (4)$$

In the equations, RSCP (Received signal code Power) indicates received power of a desired signal, and ISSI (Interference Signal Strength Indicator) indicates received power of an interference signal. Also, $r_n = \alpha S_n + I_n$ and $r_{n+1} = \beta S_{n+1} + I_{n+1}$ hold true, wherein $\alpha$ and $\beta$ indicate amplitude variation and phase variation that are effects of fading for the transmission symbols respectively, and $I_n$ and $I_{n+1}$ indicate interference wave component including thermal noise of the symbols respectively.

In the mobile communication system of the W-CDMA scheme, two pilot symbols continuously transmitted on the time axis using a single frequency are used for calculating received power in the downlink.

In a time period during which channel variation between two pilot symbols is small, propagation paths can be regarded as almost the same propagation path. Thus, coefficients $\alpha$ and $\beta$ of variation of propagation paths by which $S_n$ and $S_{n+1}$ are multiplied respectively can be regarded to be almost the same, so that received power of the desired signal and the interference signal can be estimated accurately. That is, when $r_n$ and $r_{n+1}$ can be regarded to be almost the same, $\lambda_1$ represents components in which the desired signal component and the interference signal component of the two symbols are added, and $\lambda_2$ represents only interference components of two symbols. Thus, the desired signal component can be obtained by $|\lambda_1 - \lambda_2|/2$.

However, as shown in FIG. 2, the mobile communication system of the LTE (Long Term Evolution) scheme is configured such that pilot symbols are mapped on the time axis and the frequency axis discontinuously, and transmitted. In the mobile communication system of the LTE scheme, the pilot symbol may be called a reference signal (RS). Therefore, in the case in which the propagation path is estimated using two pilot symbols, if delay path and moving time are large, propagation paths between two pilot symbols cannot be regarded as the same propagation path. That is, $\alpha$ and $\beta$ cannot be regarded to be the same, so that correlation between received signals ($r_n$ and $r_{n+1}$) becomes small. Thus, in the equation (2), the interference signal component cannot be extracted, so that received power of the desired signal power cannot be estimated accurately.

RELATED ART DOCUMENT

[Patent Document]
Patent document 1: Japanese Laid-Open Patent Application No. 2009-129510
Patent document 2: Japanese Laid-Open Patent Application No. 2006-191583

SUMMARY OF THE INVENTION

Problem to be Solved by the Invention

In the mobile communication system of the LTE scheme, since the pilot symbols are mapped on the time axis and the frequency axis discontinuously and transmitted, propagation paths between pilot symbols cannot be regarded as the same propagation path. In the mobile communication system, especially, when effect of delay path and moving speed of the receiving apparatus are large, correlation between pilot symbols becomes small, so that received power of the desired signal and the interference signal cannot be estimated accurately.

Therefore, in order to estimate received power of the desired signal and the interference signal accurately in the mobile communication system of the LTE scheme, it is necessary to increase correlation between two pilot symbols using a method of decreasing the moving speed of the receiving apparatus or a method of performing measurement for a long time in an environment where there is no delay path.

The present invention is contrived in view of the above-mentioned problems, and an object of the present invention is to provide a receiving apparatus and a receiving method that can calculate the received power of a downlink signal accurately using pilot symbols, included in a received signal, that are mapped discontinuously on the frequency axis and the time axis.

Means for Solving the Problem

To solve the above-mentioned problem, the receiving apparatus is a receiving apparatus configured to receive a downlink signal in which pilot symbols are mapped discontinuously on a frequency axis and on a time axis, including:

a first Fourier transform unit configured to perform Fourier transform on the downlink signal;

an extraction unit configured to extract reference signals included in a predetermined band from the downlink signal that is Fourier transformed by the first Fourier transform unit;

an inverse Fourier transform unit configured to generate a first signal having a first window size by arranging the reference signals, extracted by the extraction unit, on the frequency axis and by performing inverse Fourier transform on the reference signals arranged on the frequency axis;

a time extraction unit configured to divide the first signal into a plurality of signals to extract a signal included in a second window;

an adjustment unit configured to generate a second signal that includes the signal included in the second window and that has a window size similar to the first window size;

a second Fourier transform unit configured to generate a third signal by performing Fourier transform on the second signal; and a received power calculation unit configured to calculate received power based on the third signal.

The receiving method is a receiving method in a receiving apparatus configured to receive a downlink signal in which pilot symbols are mapped discontinuously on a frequency axis and on a time axis, including:

a first Fourier transform step of performing Fourier transform on the downlink signal;

an extraction step of extracting reference signals included in a predetermined band from the downlink signal that is Fourier transformed by the first Fourier transform step;

an inverse Fourier transform step of generating a first signal having a first window size by arranging the reference signals, extracted by the extraction step, on the frequency axis and by performing inverse Fourier transform on the reference signals arranged on the frequency axis;

a time extraction step of dividing the first signal into a plurality of signals to extract a signal included in a second window;

an adjustment step of generating a second signal that includes the signal included in the second window and that has a window size similar to the first window size;

a second Fourier transform step of generating a third signal by performing Fourier transform on the second signal; and a received power calculation step of calculating received power based on the third signal.

Effect of the Present Invention

According to the disclosed receiving apparatus and the receiving method, received power of the downlink signal can be estimated accurately by using pilot symbols, included in a received signal, that are mapped discontinuously on the frequency axis and on the time axis.

BRIEF DESCRIPTION OF THE DRAWINGS

FIG. 12 is an explanatory diagram showing operation of the receiving apparatus according to an embodiment.

EMBODIMENTS FOR CARRYING OUT THE INVENTION

In the following, embodiments of the present invention are descried with reference to attached figures. In all of the drawings illustrating the embodiments, the same reference symbols are attached to those having the same functions, and descriptions thereof are not repeated.

In the mobile communication system of the LTE scheme, there is a method for measuring received power (to be referred to as desired wave power hereinafter) of a desired signal and received power (to be referred to as interference signal power hereinafter) of an interference signal by performing addition and subtraction for two vector signals (received signals). However, when the downlink signal includes a delay path and/or when moving speed of the receiving apparatus is large, correlation between reference signals is deteriorated (becomes low), so that there is a case in which the desired signal power and the interference signal power cannot be measured accurately. The reason is that propagation path between reference signals cannot be regarded to be the same propagation path.

A case where the downlink signal includes the delay path is described with reference to FIG. 3.

Figure 1:
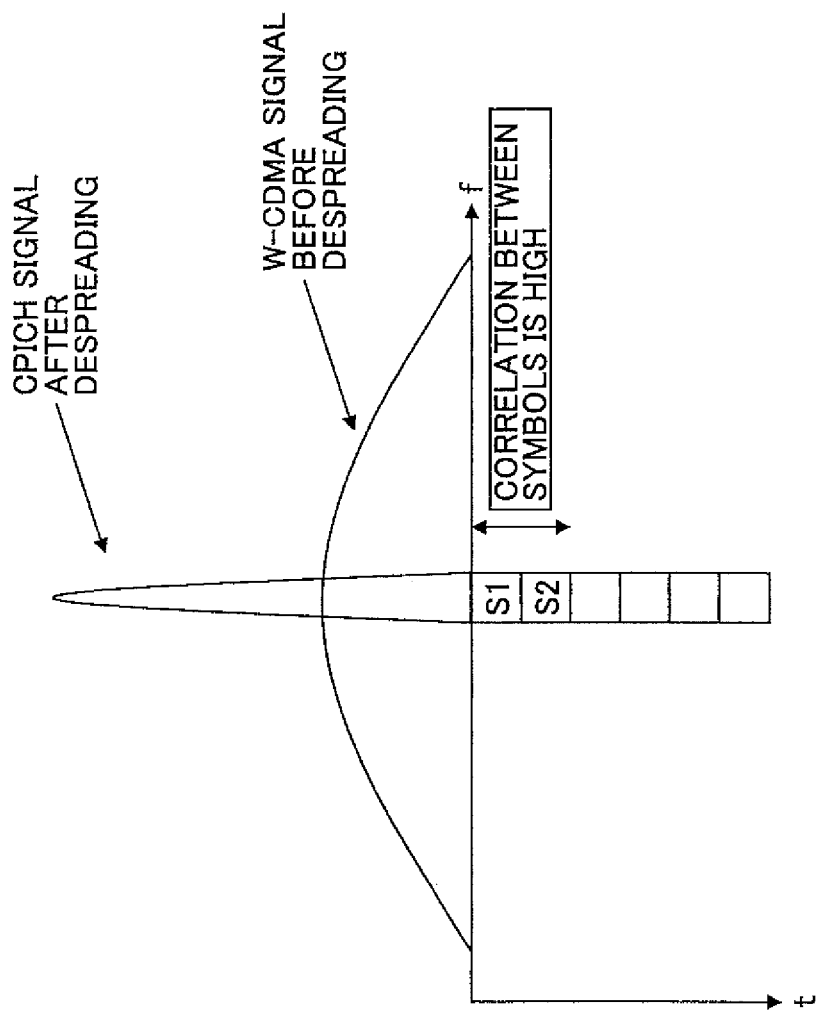
FIG. 1 is an explanatory diagram showing a method for calculating an average value of measurement values of pilot signals in a mobile communication system of the W-CDMA scheme.
Figure 2:
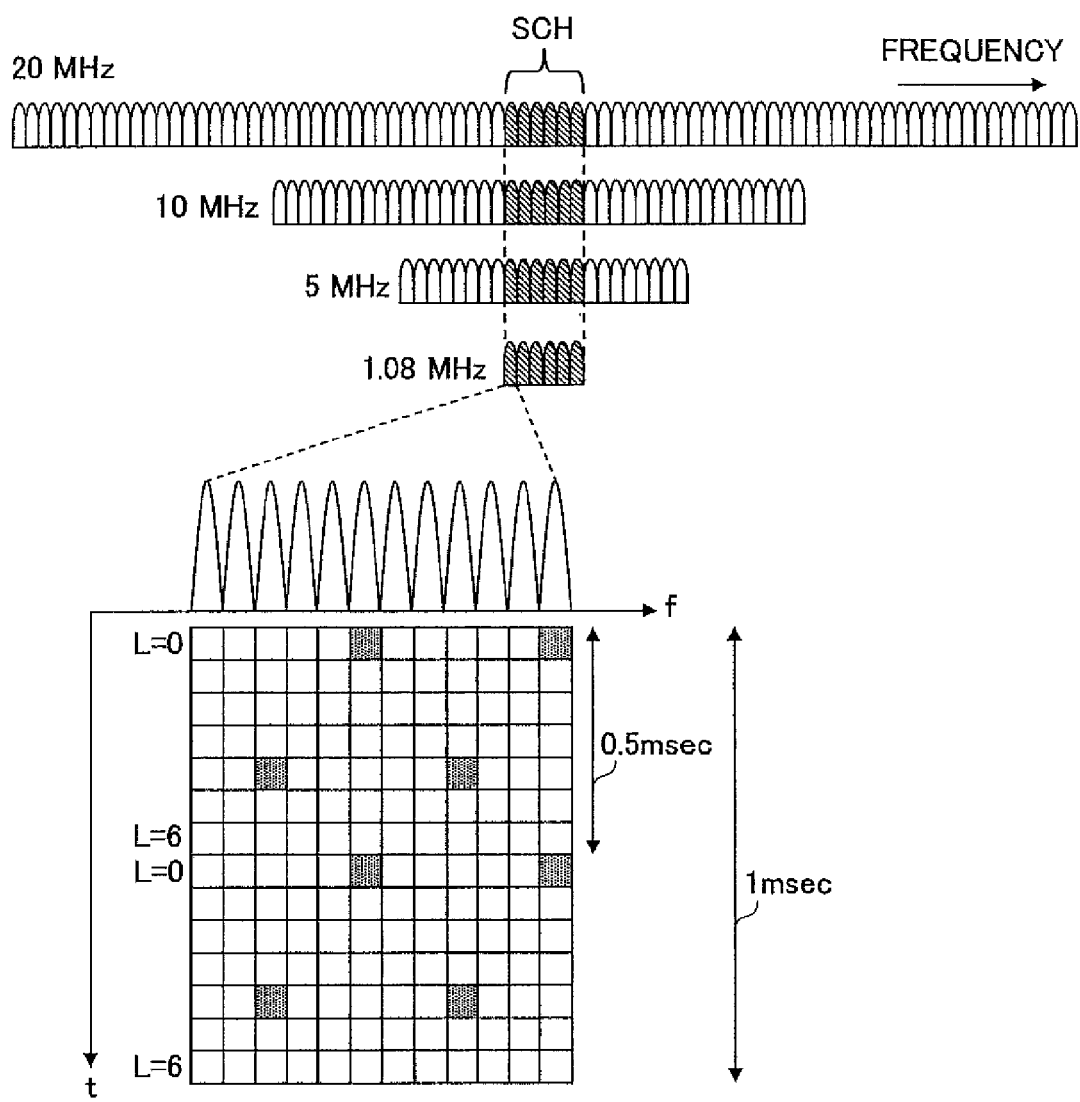
FIG. 2 is an explanatory diagram showing a transmission method of the pilot signal in a mobile communication system of the LTE scheme.
Figure 3:
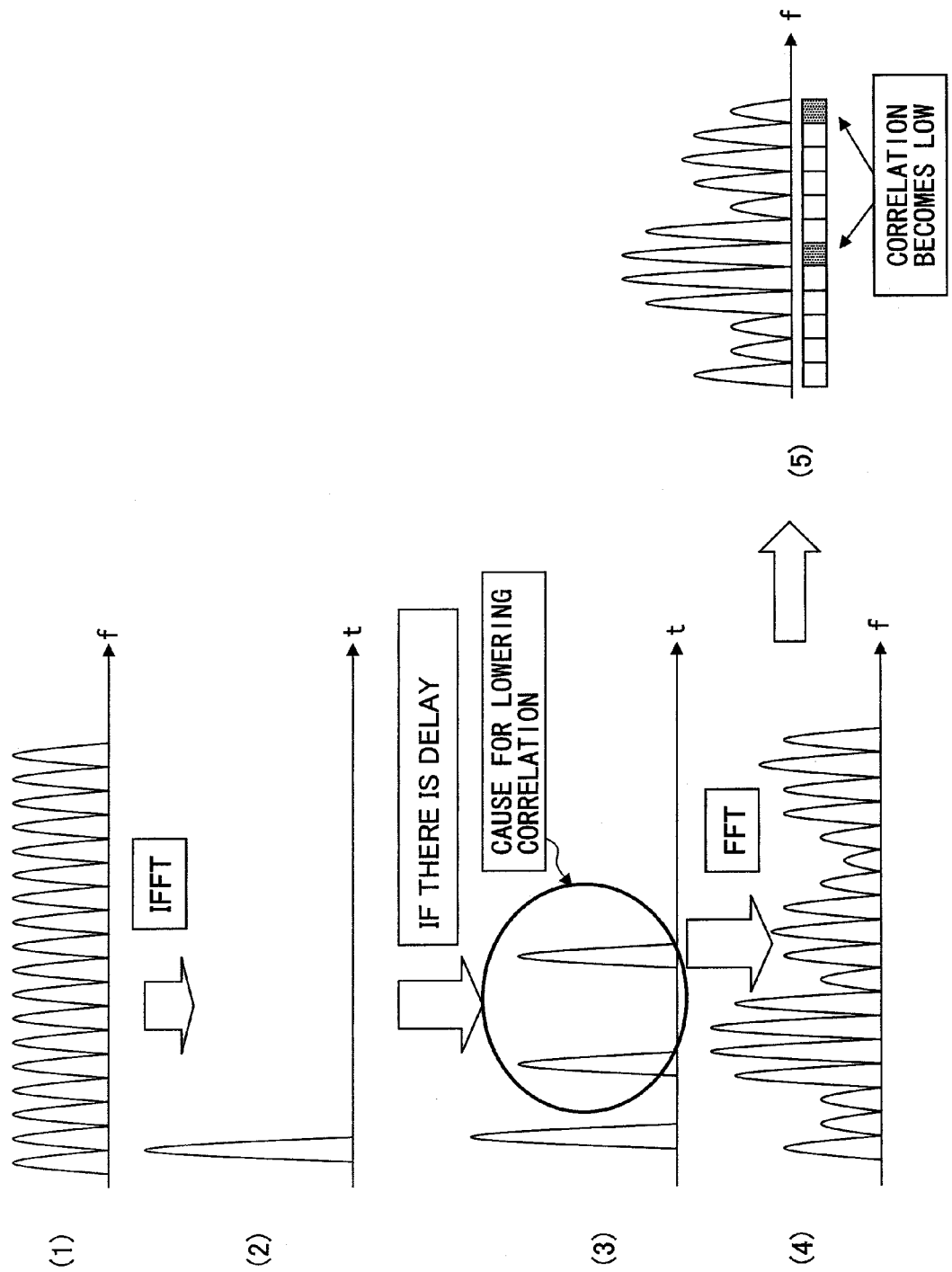
FIG. 3 is an explanatory diagram showing processing in a receiving apparatus.

A base station 200 transmits a downlink signal (FIG. 3(1)). The downlink signal includes a reference signal (described as RS hereinafter). A receiving apparatus 100 calculates received power in the downlink using the RS included in the downlink signal transmitted by the base station apparatus 200. The received power in the downlink includes received power (to be referred to as desired signal power) of a desired signal and received power (to be referred to as an interference signal power hereinafter) of an interference signal.

The receiving apparatus 100 converts the downlink signal into a signal represented on the time axis by performing inverse fast Fourier (IFFT) transform. When a delay path is not included in the downlink signal, one peak appears in the signal represented on the time axis (FIG. 3(2)). On the other hand, when the downlink signal includes the delay path, multiple peaks appear in the signal represented on the time axis (FIG. 3(3)). In addition, the signal represented on the time axis in the case when the delay path is included is converted to a signal represented on the frequency axis by performing fast Fourier transform (FFT) (FIG. 3(4)). In this case, correlation between adjacent pilot symbols becomes low (FIG. 3(5)). That is, it can be understood that there is the delay path as a cause of lowering correlation of RSs.

For the problem that the desired signal power and the interference signal power cannot be measured accurately, there is a method for measuring the desired signal power and the interference signal power by selecting RSs having high correlation.

Figure 4:
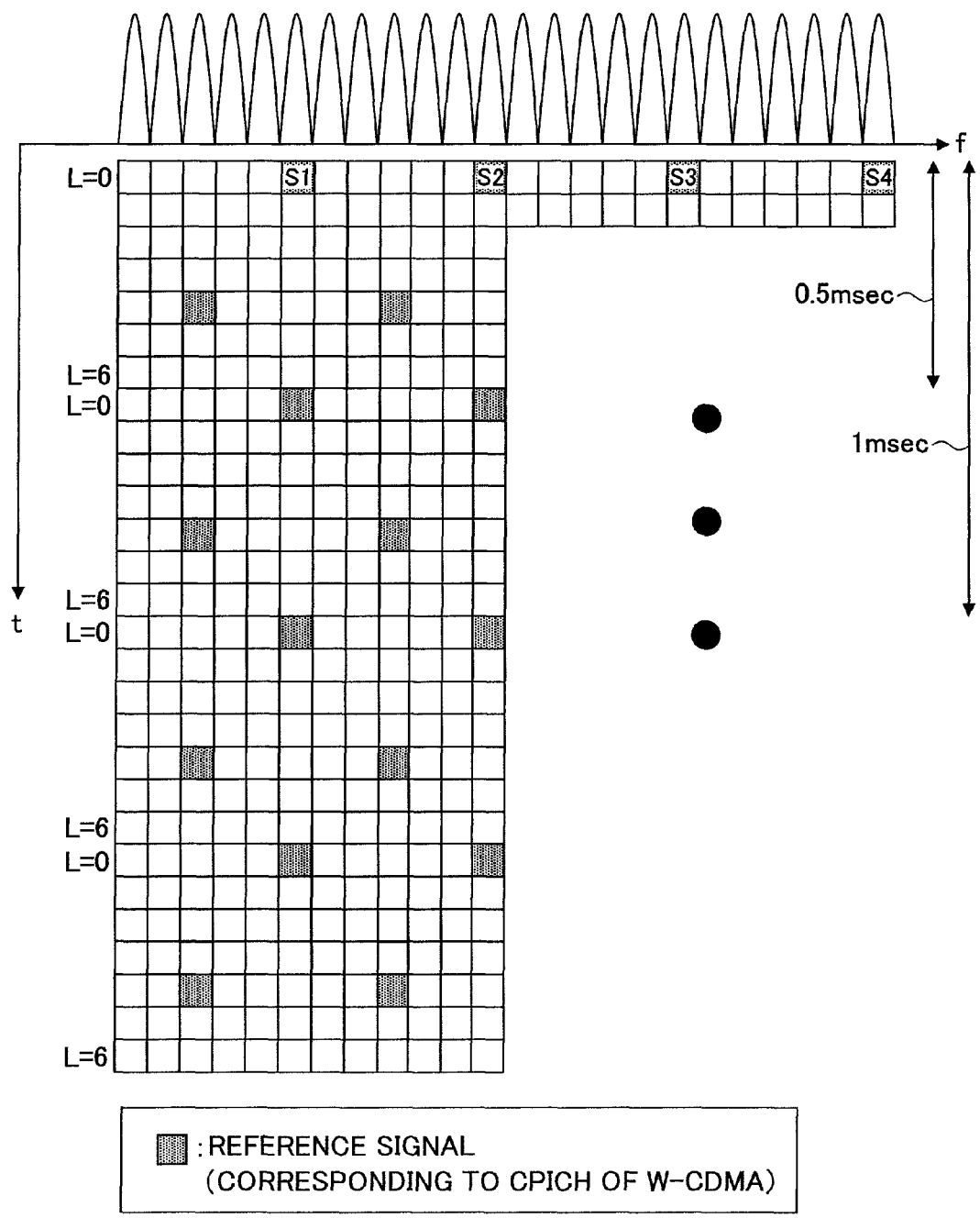
FIG. 4 is an explanatory diagram showing processing in a receiving apparatus.

For example, in this method, calculation of the desired signal power and the interference signal power is performed using two vector signals (received signals). As shown in FIG. 4, in the mobile communication system of the LTE scheme, pilot symbols are mapped discontinuously on the time axis and the frequency axis, and transmitted.

It is assumed that a first RS(S1) is Aα, and a second RS(S2) is Aβ. The second RS(S2) may be represented as −Aβ. S1 and S2 are known signals respectively. For example, they may be 1 or −1. By multiplying S1 and S2 by similar signals such as 1 or −1, they can be regarded as a same signal. For example, like −1×(−1)=1, 1×1=1, there is a case where they can be regarded as a same signal.

Calculation is performed for obtaining correlation between α and β on the frequency axis, and it is determined whether the desired signal power and the interference signal power are measured based on the correlation value.

Figure 5:
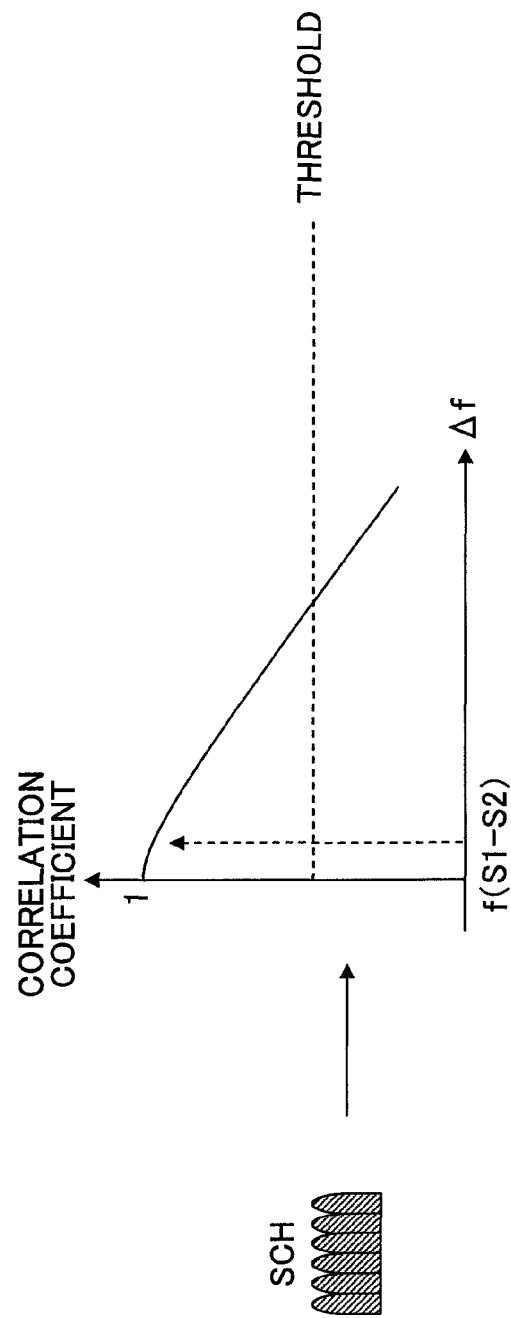
FIG. 5 is an explanatory diagram showing processing in a receiving apparatus.

As shown in FIG. 5, a delay spread is obtained using a synchronization channel (SCH) for a given time period, so that a correlation value between the first RS(S1) and the second RS(S2) on the frequency axis is obtained based on the delay spread. Then, when the correlation value on the frequency axis is equal to or greater than a threshold, following processing is performed for RS(S1,S2) corresponding to a correlation value on the frequency axis.

As an example, a case is described where the correlation value between the first RS(S1) and the second RS(S2) on the frequency axis is equal to or greater than the threshold value. In the processing, $$RSRP=|\lambda_1-\lambda_2|/2$$

$$ISSI=\lambda_2$$

are obtained by using $$\lambda_1=(S1+S2)^2/2$$

$$\lambda_2=(S1-S2)^2/2.$$

For other RSs such as the second RS(S2) and the third RS(S3), λ1 and λ2 can be calculated similarly as follows.

$$\lambda_1=1/(2(n-1))\times\Sigma(Sn+(Sn+1))^2(n=1,2,\ldots n)$$

$$\lambda_2=1/(2(n-1))\times\Sigma(Sn-(Sn+1))^2(n=1,2,\ldots n)$$

Therefore, RSRP and ISSI in the time can be calculated as follows respectively.

$$RSRP=|\lambda_1-\lambda_2|/2$$

$$ISSI=\lambda_2$$

Also, the correlation value on the frequency axis can be obtained by the following equation (correlation function).

$$P(\Omega)=1/(1+j2\pi\Omega(\Delta l/c))\exp(j2\pi lo/c)$$

In the equation, Ω indicates a frequency difference between a frequency f(S1) by which the first RS(S1) is transmitted and a frequency f(S2) by which a second RS(S2) is transmitted. Δl/c indicates a spread of propagation delay time between f(S1) and f(S2) obtained from the delay profile, and lo indicates the shortest propagation path length between the base station and the receiving apparatus.

Also, correlation values on the frequency axis may be stored as a table beforehand. For example, the values may be prepared for each of predetermined areas such as an urban area and a suburb area and the like. Then, a correlation value on the frequency axis between symbols at the same time is obtained from the table, and when the correlation value is equal to or greater than a threshold, the above-mentioned calculation may be performed for symbols near the symbols for which the correlation value is obtained.

According to this method, there is a problem in that, when the number of RSs of high correlation is small, it takes time for calculation in order to keep the estimation accuracy of the desired signal power and the interference signal power to be high. The reason is that, since the number of RSs of high correlation is small, time is required until RSs of high correlation are detected.

Therefore, according to the present embodiment, a receiving apparatus is described that can keep the estimation accuracy of the desired signal power and the interference signal power to be high even when correlation of RSs is not high in environments such a case where delay path is included in a signal received by the receiving apparatus (mobile station, for example) and a case where the moving speed of the receiving apparatus is large. Also, in the present embodiment, a receiving apparatus is described that can estimate the desired signal power and the interference signal power with a time shorter than that for the above-mentioned method.

(System)

Figure 6:
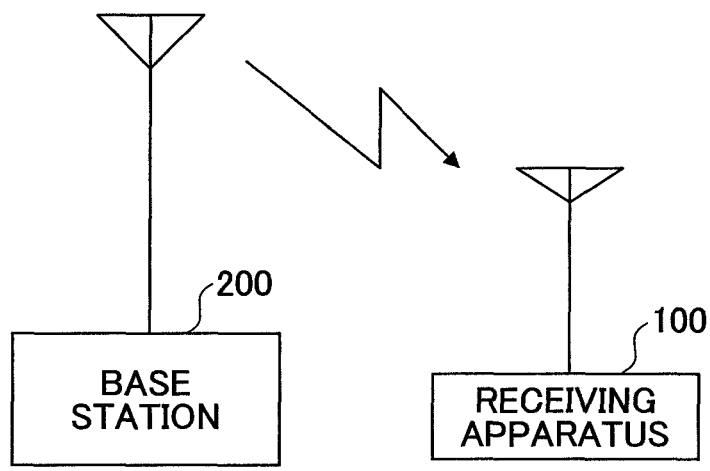
FIG. 6 is a block diagram showing a mobile communication system according to an embodiment.

A mobile communication system according to the present embodiment is described with reference to FIG. 6.

The mobile communication system of the present embodiment includes a receiving apparatus 100 and a base station 200. The receiving apparatus 100 may be included in a mobile station, for example. The receiving apparatus 100 obtains reception quality of the downlink based on a pilot channel included in a downlink signal transmitted by the base station 200. The pilot channel includes a plurality of pilot symbols. As mentioned above, the pilot symbol may be called a reference signal. Processing for obtaining the reception quality in the downlink may include processing for calculating a desired signal power and an interference signal power in the downlink. Also, a desired signal power to interference signal power ratio (SIR) may be obtained based on the desired signal power and the interference signal power in the downlink.

The receiving apparatus 100 estimates the desired signal power and the interference signal power in the downlink using the reference signal included in the downlink signal transmitted from the base station 200. In the present embodiment, as an example, a system to which Evolved UTRA and UTRAN (another name: Long Term Evolution or Super 3G) is applied is described. Preferably, the present embodiment can be applied to a system including a transmission apparatus configured to map reference signals (pilot symbols) discontinuously on the time axis and the frequency axis to transmit the reference signals, and including a receiving apparatus configured to receive the signal transmitted by the transmission apparatus. In this case, each of the transmission apparatus and the receiving apparatus may be included in a mobile station or in a base station.

In the mobile communication system of the LTE scheme, the receiving apparatus receives a downlink signal transmitted by the OFDMA (Orthogonal Frequency Division Multiple Access) scheme. The OFDMA is a multicarrier transmission scheme where a frequency band is divided into multiple narrower frequency bands (subcarriers) and data is transmitted in the individual subcarriers. The OFDMA achieves fast transmission by arranging the subcarriers in the frequency band densely while partially overlapping the subcarriers without interfering with each other, resulting in higher frequency utilization efficiency.

(Receiving Apparatus)

Figure 7:
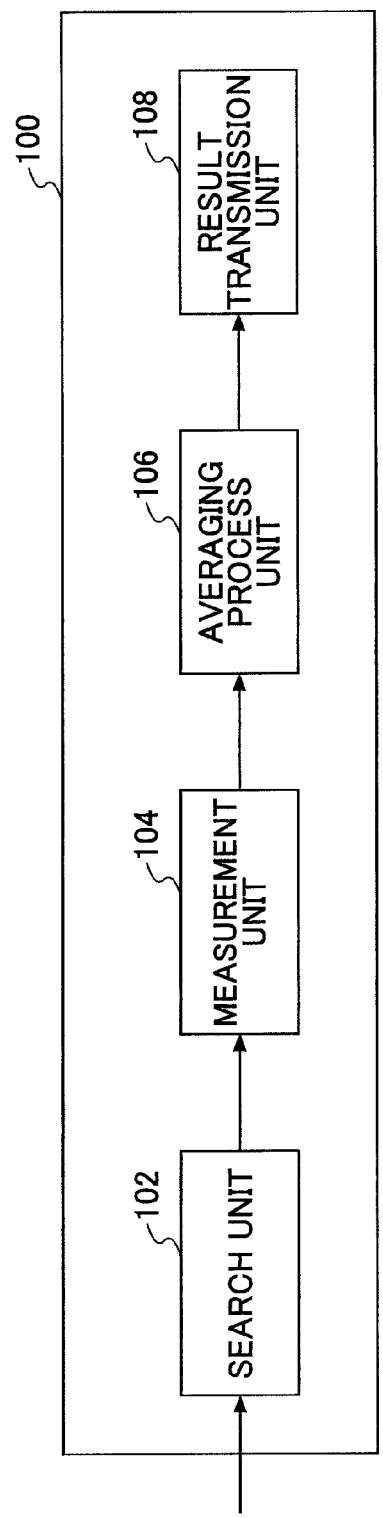
FIG. 7 is a functional block diagram showing a receiving apparatus according to an embodiment.

The receiving apparatus 100 of the present embodiment is described with reference to FIG. 7.

The receiving apparatus 100 includes a search unit 102, a measurement unit 104, an averaging process unit 106 and a result transmission unit 108.

The search unit 102 is configured to search a synchronization channel (SCH) transmitted from each base station, and to synchronize with each base station based on the SCH signal. The base station 200 maps the synchronization channel to a frequency band of a center part of the transmission frequency band of the base station, and transmits the synchronization channel. The search unit 102 receives the synchronization channel mapped to the frequency band of the center part of the transmission frequency band of the base station.

The measurement unit 104 extracts RSs included in the downlink signal transmitted from the base station 200 after the receiving apparatus 100 is synchronized with the base station 200, and the measurement unit 104 estimates the desired signal power and the interference signal power based on the extracted RSs. Details of the method for estimating the desired signal power and the interference signal power are described later.

The averaging process unit 106 is configured to calculate a desired signal power to interference signal power ratio in the downlink by using the desired signal power and the interference signal power of RSs measured by the measurement unit 104.

The result transmission unit 108 is configured to report, to the user, the calculation result of the desired signal to interference signal power ratio in the downlink calculated by the averaging process unit 106. For example, the result transmission unit 108 may output the calculation result to a monitor. Also, the result transmission unit 108 may store the calculation result in a storage device inside the receiving apparatus 100, or may store the calculation result in a storage device outside the receiving apparatus 100. Also, the result transmission unit 108 may store the calculation result in a storage medium inside the receiving apparatus 100, or may store the calculation result in a storage medium outside the receiving apparatus 100.

Figure 8:
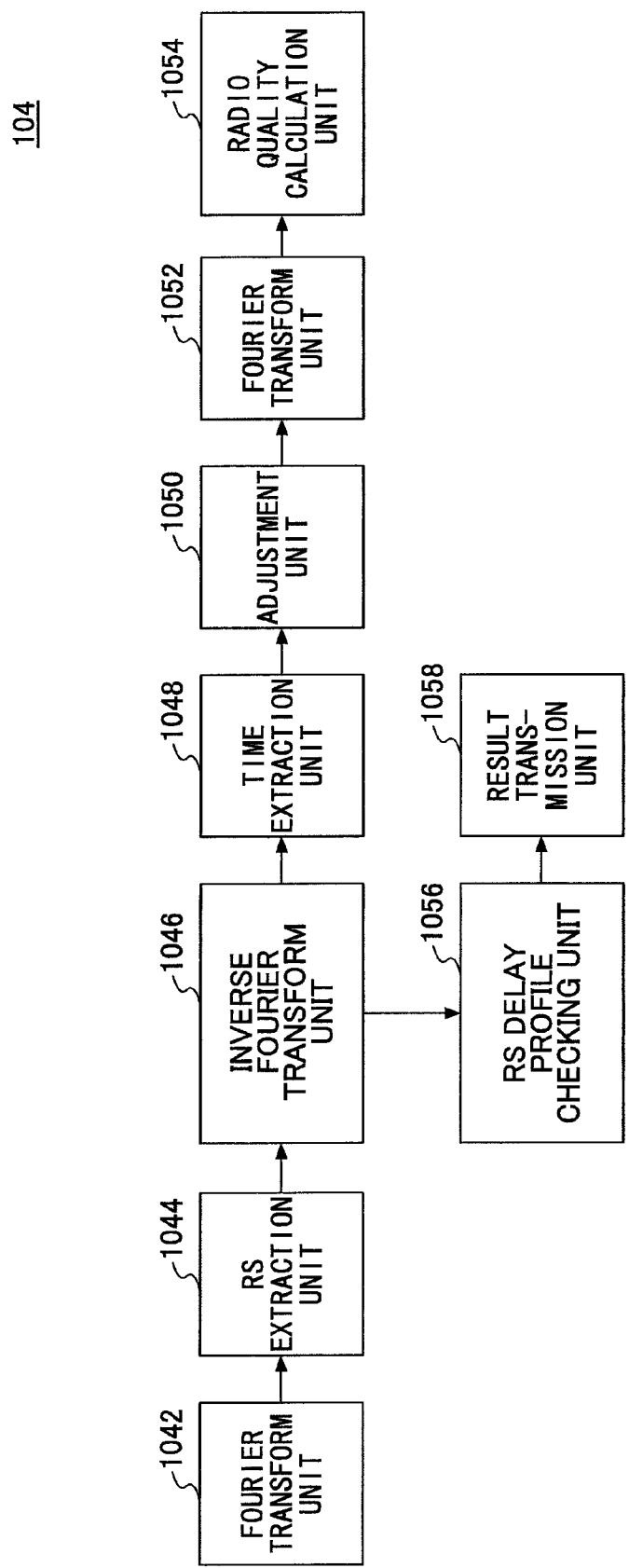
FIG. 8 is a partial block diagram showing a measurement unit of the receiving apparatus according to an embodiment.

As shown in FIG. 8, the measurement unit includes a Fourier transform unit 1042, an RS extraction unit 1044, an inverse Fourier transform unit 1046, a time extraction unit 1048, an adjustment unit 1050, a Fourier transform unit 1052, a radio quality calculation unit 1054, an RS delay profile checking unit 1056 and a result transmission unit 1058.

The Fourier transform unit 1042 generates a signal represented on the frequency axis by performing fast Fourier transform on the downlink signal received by the receiving apparatus 100.

The RS extraction unit 1044 extracts RSs included in a predetermined bandwidth from the signal represented on the frequency axis generated by the Fourier transform unit 1042. Also, the RS extraction unit 1044 may extract RSs included in a predetermined bandwidth from a signal represented on the frequency axis generated during a given time. Then, the RS extraction unit 1044 arranges the extracted RSs on the frequency axis. In the mobile communication system of the LTE scheme, RSs are mapped discontinuously on the time axis and the frequency axis. In this case, the RS extraction unit 1044 may extract RSs adjacent on the frequency axis, or may extract RSs adjacent on the time axis, or may extract both of RSs adjacent on the frequency axis and RSs adjacent on the time axis.

For example, as shown in FIG. 4, the reference signal is mapped to one subcarrier every six subcarriers in the OFDM symbol L=0, and is transmitted. Also, in the frequency direction, a resource block is defined. The frequency band per one resource block is 180 kHz, and 12 subcarriers exist in one resource block. Therefore, two reference signals are extracted when the predetermined bandwidth is the bandwidth of one resource block.

The inverse Fourier transform unit 1046 performs inverse fast Fourier transform on RSs arranged on the frequency axis to generate a signal represented on the time axis. As a result, a signal represented on the time axis having a first time window is generated. The inverse Fourier transform unit 1046 supplies the generated signal represented on the time axis to the time extraction unit 1048 and to the RS delay profile checking unit 1056.

The time extraction unit 1048 extracts a signal within a second time window from the signal represented on the time axis generated by the inverse Fourier transform unit 1046. It is preferable that the size of the second time window is less than the size of the first time window. The size of the second time window can be properly changed. For example, the size may be determined based on the peak of the signal represented on the time axis. Accordingly, the delay wave can be removed.

The adjustment unit 1050 generates a signal including the signal included in the second time window. In this case, the adjustment unit 1050 adjusts the signal such that the size of the signal becomes similar to the size of the first time window. For example, the adjustment unit 1050 inserts 0 in parts (points) other than the second time window from which the signal is extracted by the time extraction unit 1048.

The Fourier transform unit 1052 performs fast Fourier transform on the signal generated by the adjustment unit 1050 to generate a signal represented on the frequency axis. Since the effect of delay wave is reduced in the signal represented on the frequency axis generated in the above-mentioned way, it can be treated as one path. Also, correlation between RSs can be increased.

The radio quality calculation unit 1054 obtains the desired signal power and the interference signal power based on the signal represented on the frequency axis generated by the Fourier transform unit 1052.

Figure 9:
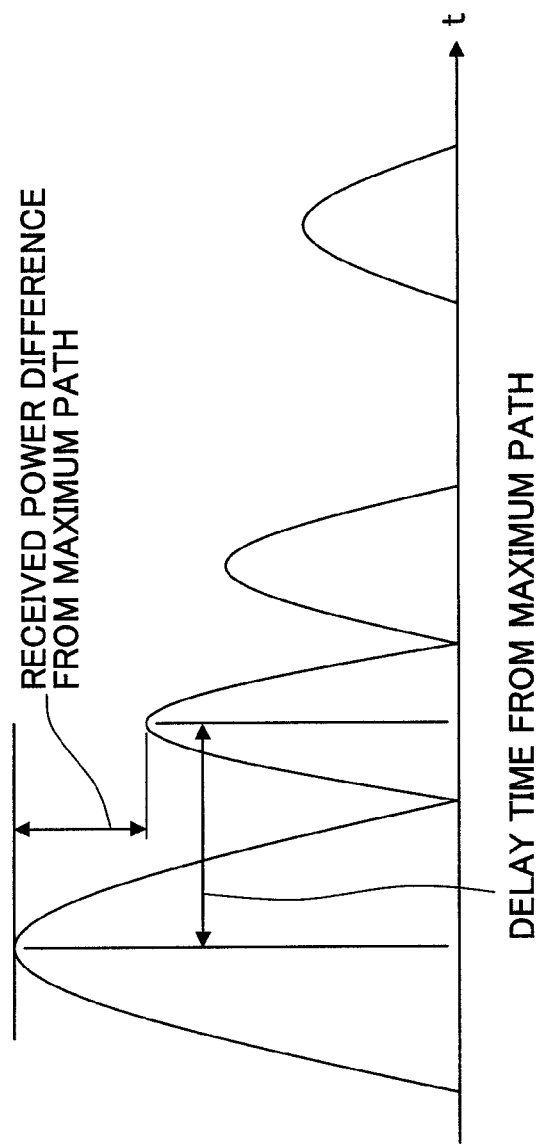
FIG. 9 is an explanatory diagram showing operation of the receiving apparatus according to an embodiment.

The RS delay profile checking unit 1056 checks the signal represented on the time axis supplied from the inverse Fourier transform unit 1046. For example, the RS delay profile checking unit 1056 may check delay time from the maximum path and received power difference from the maximum path. For example, the signal represented on the time axis supplied from the inverse Fourier transform unit 1046 is a delay profile of only RS as shown in FIG. 9. Accordingly, a sample of the delay wave of only RS can be checked. The RS delay profile checking unit 1056 supplies the delay path profile of only RS to the result transmission unit 1058. Also, the RS delay profile checking unit 1056 may supply delay time from the maximum path and received power difference from the maximum path to the result transmission unit 1058.

The result transmission unit 1058 is configured to report, to a user, a sample of the delay wave generated by the RS delay profile checking unit 1056. For example, the result transmission unit 1058 may output the sample of the delay path to the monitor. Also, the result transmission unit 1058 may store the sample of the delay path in a storage device inside the receiving apparatus 100, and may store the sample of the delay path in a storage device outside the receiving apparatus 100. Also, the result transmission unit 1058 may store the sample of the delay path in a storage medium inside the receiving apparatus 100, and may store the sample of the delay path in a storage medium outside the receiving apparatus 100.

(Operation of the Receiving Apparatus)

Figure 10:
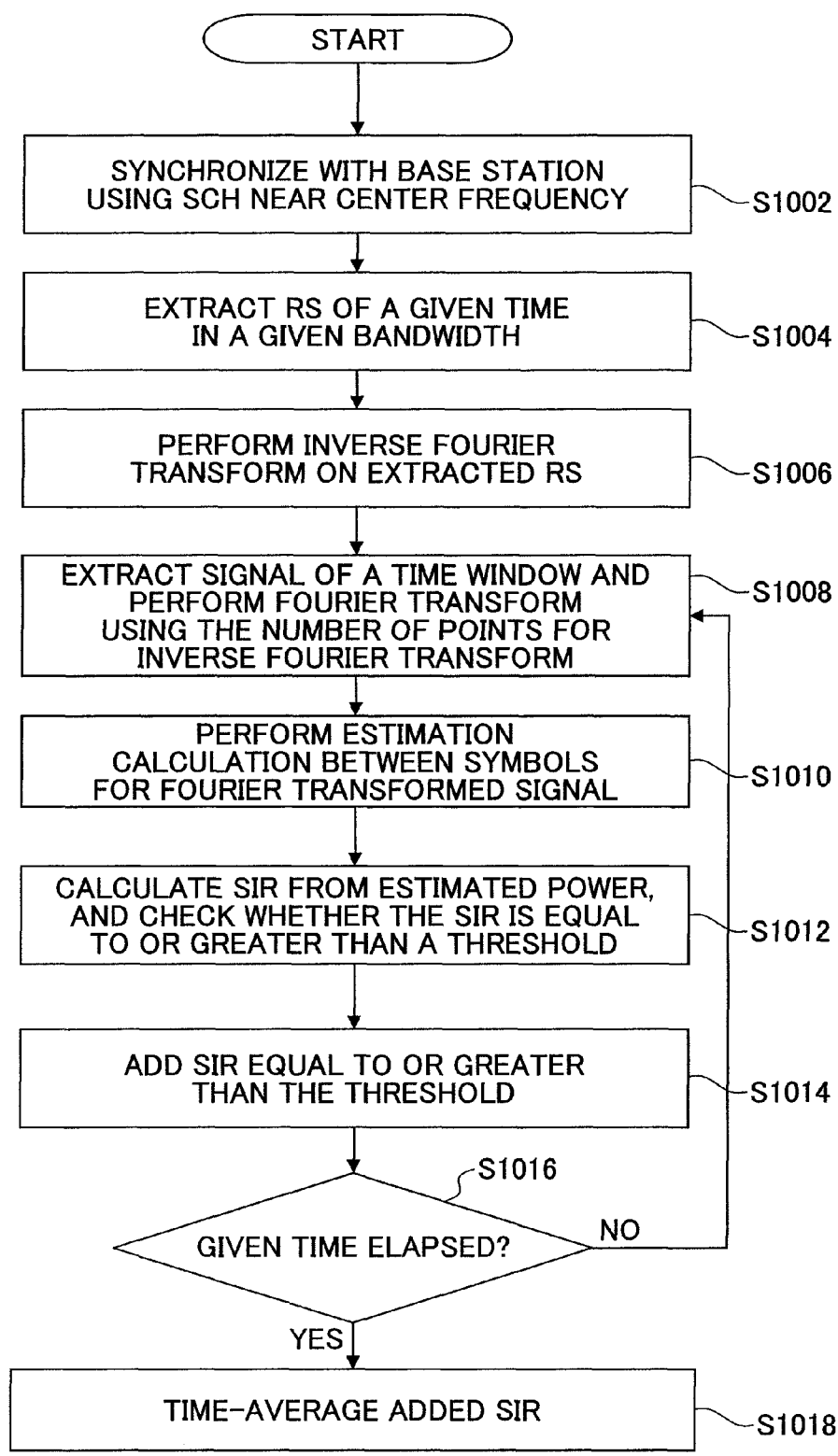
FIG. 10 is a flow diagram showing operation of the receiving apparatus according to an embodiment.
Figure 11:
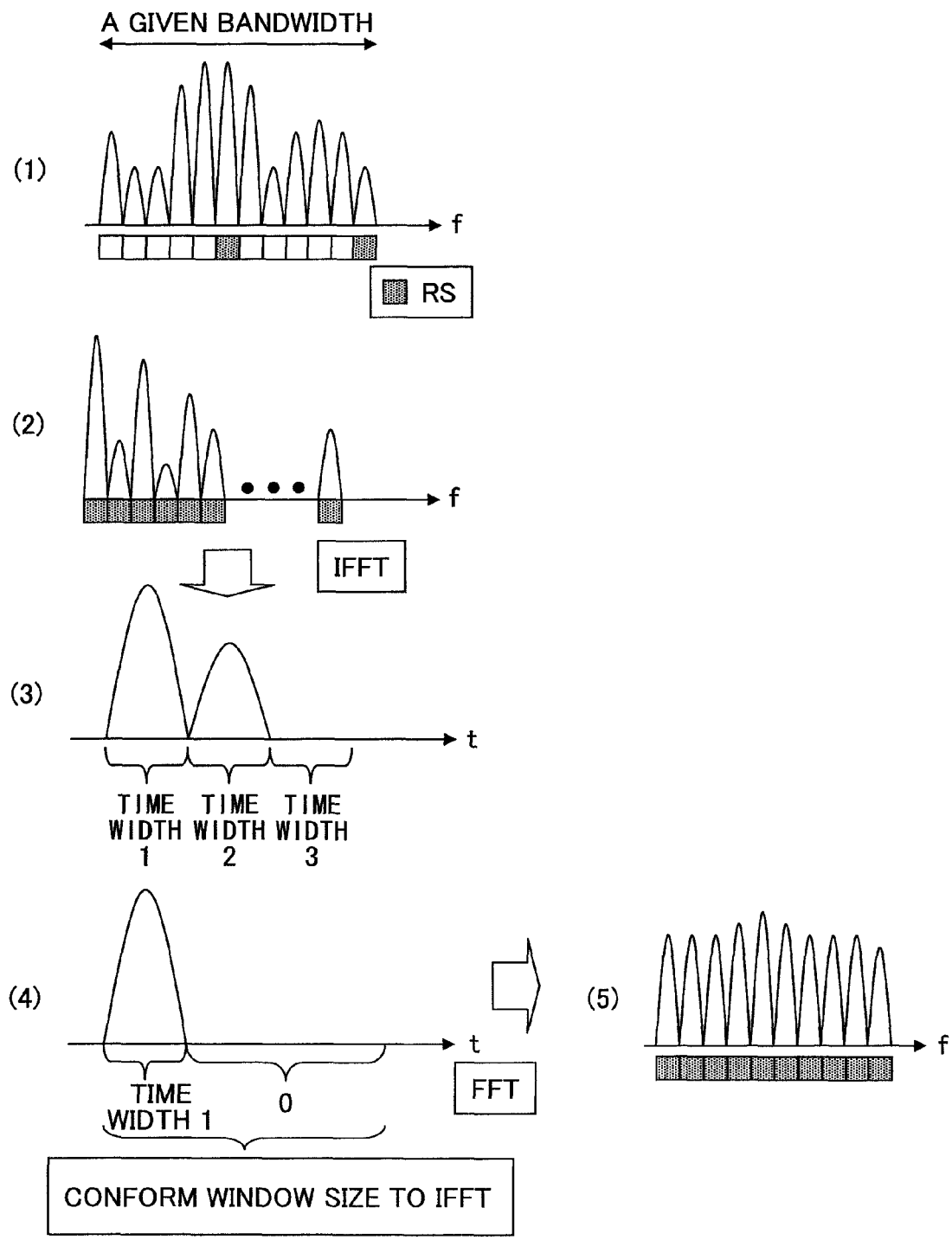
FIG. 11 is an explanatory diagram showing operation of the receiving apparatus according to an embodiment.

Operation of the mobile communication system of the present embodiment is described with reference to FIGS. 10-12. In the following, operation of the receiving apparatus 100 of the present embodiment is mainly described.

Processing for synchronizing with each other is performed between the receiving apparatus 100 and the base station 200 (step S1002). For example, the search unit 102 searches the SCH signal transmitted from the base station 200 to synchronize with the base station 200 based on the SCH signal.

After the receiving apparatus 100 and the base station 200 are synchronized with each other, the receiving apparatus 100 extracts RSs included in a given bandwidth during a given time in a downlink signal transmitted from the base station 200 (step S1004). For example, the downlink signal transmitted from the base station 200 is supplied to the Fourier transform unit 1042 of the measurement unit 104. The Fourier transform unit 1042 generates a signal represented on the frequency axis as shown in FIG. 11(1) by performing Fourier transform on the supplied downlink signal. Then, the RS extraction unit 1044 extracts RSs included in a given bandwidth from the signal represented on the frequency axis. Then, the RS extraction unit 1044 arranges the extracted RSs on the frequency axis as shown in FIG. 11(2). Also, the RS extraction unit 1044 may extract RSs included in a predetermined bandwidth from signals represented on the frequency axis generated during a given time.

The receiving apparatus 100 generates the signal represented on the time axis by performing inverse Fourier transform on the RSs extracted in step S1004 (step S1006). For example, the inverse Fourier transform unit 1046 generates the signal represented on the time axis by performing inverse Fourier transform on the RSs arranged on the frequency axis. As a result, as shown in FIG. 11(3), signals represented on the time axis having a first time window are generated. The first time window is determined based on the number of points by which inverse Fourier transform is performed. The number of points by which inverse Fourier transform is performed needs to be a power of two. The signal represented on the time axis becomes a delay profile of only RSs. FIG. 11(3) shows a delay profile including two peaks as an example.

The receiving apparatus 100 extracts signals included in a second time window, and performs Fourier transform on the signals using the number of points by which inverse Fourier transform is performed so as to generate signals represented on the frequency axis (step S1008). For example, the time extraction unit 1048 divides the signal represented on the time axis on which inverse Fourier transform has been performed into a plurality of signals using the second time window. The size of the second time window can be properly changed. For example, the time extraction unit 1048 extracts the signal included in the second time window from the signal represented on the time axis. FIG. 11(3) shows a case in which the signal represented on the time axis is divided into three using the second time window. In this case, the first time window includes time widths 1-3 divided by the second time window. The time widths 1-3 may be the same or may be different.

Then, the adjustment unit 1050 performs following processing on the signal included in the time width 1 extracted by the second time window. As shown in FIG. 11(4), the adjustment unit 1050 inserts 0 into parts (points) other than the signal included in the time width 1 extracted by the second time window. It is necessary that the number of points of the signal having the similar size of the first time window is a power of two, wherein the signal having the similar size of the first time window includes the signal included in the time width 1 and 0s inserted in the parts (points) other than the signal included in the time window 1. The Fourier transform unit 1052 generates a signal represented on the frequency axis by performing Fourier transform on the signal, of the similar size of the first time window, that includes the signal included in the time window 1 extracted by the second time window in which 0s are inserted in parts other than the second time window.

The number of samples is small for performing Fourier transform only on the signal extracted by the second time window. Thus, 0s are inserted in all points other than the signal extracted by the second time window in the first time window. That is, if the number of signals for performing fast Fourier transform is not the same as the window size of IFFT, a bandwidth of the signal represented on the frequency axis obtained by Fourier transform becomes different from a bandwidth before inverse Fourier transform in step S1006. Therefore, 0s are inserted in the points other than the extracted signal such that window sizes become the same. As mentioned above, since 0s are inserted in the parts other than the signal extracted by the second time window in order to adapt to the first time window, the bandwidth of the signal represented on the frequency axis becomes the same as the bandwidth before inverse Fourier transform of step S1006 as shown in FIG. 11(5). The signal represented on the frequency axis obtained in the above-mentioned way can be treated as a signal similar to a signal of one path since the effect of delay wave decreases.

Similar processing is performed also for signals included in the time width 2 and the time width 3 extracted by the second time window, so that signals represented on the frequency axis are generated. In the following, signals represented on the frequency axis that are generated based on signals included in time widths 1, 2 and 3 extracted by the second time window are called patterns 1, 2 and 3 respectively.

The receiving apparatus 100 performs estimation calculation between symbols for the signal, represented on the frequency axis, on which Fourier transform has been performed (step S1010). For example, the reception quality calculation unit 1054 performs calculation between symbols using equations (5) and (6). In the equations (5) and (6), $r_n$ and $r_{n+1}$ indicate adjacent RSs in the signal represented on the frequency axis. $\lambda 1$ and $\lambda 2$ indicate parameters for obtaining desired signal power and interference signal power. Then, the receiving apparatus 100 obtains the desired signal power and the interference signal power using the calculation result between symbols. For example, the radio quality calculation unit 1054 estimates the desired signal power and the interference signal power using equations (7) and (8).

$$\lambda_1 = 1/2N_S \times \sum_{1}^{N_S-1} |r_n + r_{n+1}|^2 \tag{5}$$

$$\lambda_2 = 1/2N_S \times \sum_{1}^{N_S-1} |r_n - r_{n+1}|^2 \tag{6}$$

$$\text{Desired signal power} = \frac{1}{2} \times |\lambda_1 - \lambda_2| \tag{7}$$

$$\text{Interference signal power} = \lambda_2 \tag{8}$$

For example, a case is described for estimating the desired signal power and the interference signal power from the above-mentioned patterns 1-3. FIG. 12(1) is similar to FIG. 11(3), and is a figure showing that the signal represented on the time axis is divided into three using the second time window. FIG. 12(2) shows the pattern 1, and FIG. 12(3) shows the pattern 2.

The radio quality calculation unit 1054 extracts a first RS (S1) and a second RS (S2) from the RS spectrum of the pattern 1, wherein the first RS (S1) and the second RS (S2) are vector signals respectively. The radio quality calculation unit 1054 obtains $\lambda_1 = (S1+S2)^2/2$ and $\lambda_2 = (S1-S2)^2/2$. Then, the radio quality calculation unit 1054 obtains the desired signal power and the interference signal power. The desired signal power can be obtained as $|\lambda_1-\lambda_2|/2$, and the interference signal power can be obtained as $\lambda_2$.

Similar calculation can be performed for other reference signals such as the second RS(S2) and the third RS(S3). That is, the desired signal power and the interference signal power can be obtained by the following equations.

$$\lambda_1=1/(2(n-1))\times\Sigma|Sn+(Sn+1)|^2 (n=1,2,\ldots,n)$$

$$\lambda_2=1/(2(n-1))\times\Sigma|Sn-(Sn+1)|^2 (n=1,2,\ldots,n)$$

Desired signal power=$|\lambda_1-\lambda_2|/2$

Interference signal power=$\lambda_2$

Similar processing is performed also for patterns 2 and 3. However, as to the pattern 3, the desired signal power does not exist, and only noise exists. For example, the desired signal power becomes a value near 0 (ideally 0), and the interference signal power takes a value.

The receiving apparatus 100 calculates a desired signal power to interference signal power ratio (SIR) from the desired signal power and the interference signal power that are estimated in step S1010, and checks whether the SIR is equal to or greater than a threshold (step S1012). For example, the averaging process unit 106 receives the desired signal power and the interference signal power that are estimated by the radio quality measurement unit 1054. The averaging process unit 106 obtains the desired signal power to interference signal power ratio based on the supplied desired signal power and the interference signal power.

The desired signal power to interference signal power ratio is obtained by dividing the desired signal power by the interference signal power.

As to the pattern 1, the desired signal power to interference signal power ratio is obtained as $SIR_1$=(desired signal power)/(interference signal power). Also, as to the pattern 2, $SIR_2$ is obtained similarly. As to the pattern 3, since the desired signal power is a value near 0, $SIR_3$ becomes a small value. Or, $SIR_3$ cannot be obtained.

The averaging process unit 106 determines whether the desired signal power to interference signal power ratio is equal to or greater than a threshold. In this example, it is assumed that each of $SIR_1$ and $SIR_2$ is equal to or greater than the threshold. Accordingly, in the case like the pattern 3 in which the desired signal power does not exist and only noise exists, by determining whether the obtained SIR is equal to or greater than the threshold, SIR obtained based on the noise can be removed. The reason is that SIR obtained based on the noise becomes a small value. From the viewpoint of removing only SIR obtained from the noise, the threshold value may be set to be a minus infinite value.

The receiving apparatus 100 adds SIRs that are equal to or greater than the threshold in step S1012 (step S1014). For example, the averaging process unit 106 performs calculation of equation (9) for SIRs of $SIR_n$>threshold.

$$SIR = \sum_{n=1}^{k} SIR_n \qquad (9)$$

The receiving apparatus 100 determines whether a given time has elapsed (step S1016). When the given time has not elapsed (S1016: NO), the process returns to step S1008. The given time may be similar to the given time for extracting RSs in step S1004. Also, the given time may be a time set beforehand for obtaining SIR. On the other hand, when the given time has elapsed (step S1016: YES), a time average of the SIRs added in step S1014 is obtained (step S1018). For example, the averaging process unit 106 may obtain the time average of SIR by dividing the SIRs added in step S1014 by a given time.

In the present embodiment, it is not essential to provide a threshold for SIR.

In the present embodiment, the desired signal power and the interference signal power can be also obtained by calculation similar to that for SIR. For example, it is assumed that the desired signal power is RSRP, and the interference signal power is ISSI. Also, it is assumed that RSRPs obtained by RS spectrum of patterns 1, 2 and 3 are $RSRP_1$, $RSRP_2$ and $RSRP_3$ respectively, and that ISSIs obtained by RS spectrum of patterns 1, 2 and 3 are $ISSI_1$, $ISSI_2$ and $ISSI_3$ respectively. RSRP and ISSI can be obtained by equations (10) and (11) respectively. In this case, in the equations (10) and (11), k=3.

$$RSRP = \sum_{n=1}^{k} RSRP_n \qquad (10)$$

$$ISSI = \sum_{n=1}^{k} ISSI_n \qquad (11)$$

Also, for each of $RSRP_1$, $RSRP_2$ and $RSRP_3$, and $ISSI_1$, $ISSI_2$ and $ISSI_3$, a threshold may be set so that calculation may be performed for RSRPs and ISSIs equal to or greater than the threshold. Also, it is not essential for providing a threshold.

According to the present embodiment, the received OFDM signal is Fourier-transformed, and reference signals included in a predetermined band are extracted from the Fourier-transformed downlink signal so as to remove effects of delay path. Thus, received power in the downlink can be calculated accurately.

According to the present embodiment, the received OFDM signal is Fourier-transformed, and reference signals included in a predetermined band are extracted from the Fourier-transformed downlink signal so as to remove effects of delay path. Thus, correlation between reference signals in the frequency domain can be increased. Therefore, downlink received power can be calculated accurately without performing measurement for a long time in an environment in which there is no delay path. Also, even when the moving speed of the receiving apparatus is large, the downlink received power can be calculated accurately.

The above-mentioned operation of each of the receiving apparatus 100 and the base station 200 may be carried out by hardware, or may be carried out by software modules executed by a processor, or may be carried out by a combination of both of them.

The software module may be stored in a storage medium of arbitrary types such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk and a CD-ROM.

The storage medium is connected to the processor such that the processor can read/write information from/to the storage medium. Also, the storage medium may be integrated in a processor. The storage medium and the processor may be provided in an ASIC. The ASIC may be provided in the receiving apparatus 100 or the base station 200. Also, the storage medium and the processor may be provided in the receiving apparatus 100 or the base station 200 as a discrete component.

Although the present invention has been described in detail with reference to the above-mentioned embodiments, it is apparent for a person skilled in the art that the present invention is not limited to the embodiments described in the specification. The present invention can be carried out as modifications and alterations without departing from the intent and the scope of the present invention defined by the claims. Therefore, the description of the specification is made for illustrative purposes, and does not have limiting meaning for the present invention.

Although the present invention has been described with reference to specific embodiments, these embodiments are simply illustrative, and various variations, modifications, alterations, substitutions and so on could be conceived by those skilled in the art. The present invention has been described using specific numerals in order to facilitate understandings of the present invention, but unless specifically stated otherwise, these numerals are simply illustrative, and any other appropriate value may be used. Classification into each embodiment or each item is not essential in the present invention, and equal to or more than two embodiments or items may be used as necessary. For convenience, apparatuses according to the embodiments of the present invention have been described with reference to functional block diagrams, but the apparatuses may be implemented in hardware, software or combinations thereof. The present invention is not limited to the above-mentioned embodiment and is intended to include various variations, modifications, alterations, substitutions and so on without departing from the spirit of the present invention.

The present international application claims priority based on Japanese patent application No. 2008-248880, filed in the JPO on Sep. 26, 2008, and the entire contents of the Japanese patent application No. 2008-248880 are incorporated herein by reference.

List of Reference Symbols
100 receiving apparatus
102 search unit
104 measurement unit
106 averaging process unit
108 result transmission unit
1042 Fourier transform unit
1044 RS extraction unit
1046 inverse Fourier transform unit
1048 time extraction unit
1050 adjustment unit
1052 Fourier transform unit
1054 radio quality calculation unit
1056 RS delay profile checking unit
1058 result transmission unit
200 base station

The invention claimed is:

1. A receiving apparatus configured to receive a downlink signal in which pilot symbols are mapped discontinuously on a frequency axis and on a time axis, comprising:
a first Fourier transform unit configured to perform Fourier transform on the downlink signal;
an extraction unit configured to extract reference signals included in a predetermined band from the downlink signal that is Fourier transformed by the first Fourier transform unit;
an inverse Fourier transform unit configured to generate a first signal having a first window size by arranging the reference signals, extracted by the extraction unit, on the frequency axis and by performing inverse Fourier transform on the reference signals arranged on the frequency axis;
a time extraction unit configured to divide the first signal into a plurality of signals to extract a signal included in a second window;
an adjustment unit configured to generate a second signal that includes the signal included in the second window and that has a window size similar to the first window size;
a second Fourier transform unit configured to generate a third signal by performing Fourier transform on the second signal; and
a radio quality calculation unit configured to calculate received power based on the third signal.

2. The receiving apparatus as claimed in claim 1, wherein the extraction unit extracts adjacent reference signals on the frequency axis or the time axis.

3. The receiving apparatus as claimed in claim 1, wherein the adjustment unit generates the second signal by inserting 0 in points other than the signal included in the second window.

4. The receiving apparatus as claimed in claim 1, wherein the radio quality calculation unit calculates received power of a desired signal and received power of an interference signal.

5. The receiving apparatus as claimed in claim 4, comprising:
a power ratio calculation unit configured to obtain a desired signal power to interference signal power ratio based on the received power of the desired signal and the received power of the interference signal;
a determination unit configured to determine whether the desired signal power to interference signal power ratio obtained by the power ratio calculation unit is equal to or greater than a predetermined threshold; and
an adding unit configured to add desired signal power to interference signal power ratios determined to be equal to or greater than the predetermined threshold by the determination unit.

6. The receiving apparatus as claimed in claim 1, comprising:
an output unit configured to output a delay profile only for the reference signal based on the first signal.

7. A receiving method in a receiving apparatus configured to receive a downlink signal in which pilot symbols are mapped discontinuously on a frequency axis and on a time axis, comprising:
a first Fourier transform step of performing Fourier transform on the downlink signal;
an extraction step of extracting reference signals included in a predetermined band from the downlink signal that is Fourier transformed by the first Fourier transform step;
an inverse Fourier transform step of generating a first signal having a first window size by arranging the reference signals, extracted by the extraction step, on the frequency axis and by performing inverse Fourier transform on the reference signals arranged on the frequency axis;
a time extraction step of dividing the first signal into a plurality of signals to extract a signal included in a second window;
an adjustment step of generating a second signal that includes the signal included in the second window and that has a window size similar to the first window size;
a second Fourier transform step of generating a third signal by performing Fourier transform on the second signal; and a radio quality calculation step of calculating received power based on the third signal.

* * * * *